United States Patent
Bradenburg et al.

(10) Patent No.: US 9,238,913 B2
(45) Date of Patent: Jan. 19, 2016

(54) COMPOSITE ROOF SYSTEMS AND METHODS OF INSTALLATION

(71) Applicant: Seaman Corporation, Wooster, OH (US)

(72) Inventors: Frank Bradenburg, Wooster, OH (US); Dennis M. Solar, Cleveland, OH (US); Jerry Beall, Wooster, OH (US)

(73) Assignee: Seaman Corporation, Wooster, OH (US)

( * ) Notice: Subject to any disclaimer, the term of this patent is extended or adjusted under 35 U.S.C. 154(b) by 0 days.

(21) Appl. No.: 14/797,830

(22) Filed: Jul. 13, 2015

(65) Prior Publication Data

US 2015/0315791 A1 Nov. 5, 2015

Related U.S. Application Data

(63) Continuation of application No. 14/169,953, filed on Jan. 31, 2014, now Pat. No. 9,103,123.

(60) Provisional application No. 61/759,619, filed on Feb. 1, 2013.

(51) Int. Cl.
| | |
|---|---|
| *E04D 5/12* | (2006.01) |
| *B32B 5/02* | (2006.01) |
| *B32B 27/12* | (2006.01) |
| *B32B 3/08* | (2006.01) |
| *B32B 7/12* | (2006.01) |
| *E04D 5/06* | (2006.01) |
| *E04D 5/14* | (2006.01) |

(52) U.S. Cl.
CPC . *E04D 5/12* (2013.01); *B32B 3/085* (2013.01); *B32B 5/026* (2013.01); *B32B 7/12* (2013.01); *B32B 27/12* (2013.01); *E04D 5/06* (2013.01); *E04D 5/148* (2013.01); *B32B 2260/046* (2013.01); *B32B 2305/08* (2013.01); *B32B 2419/06* (2013.01)

(58) Field of Classification Search
CPC .............. E04D 5/06; E04D 5/10; E04D 5/148
USPC ......... 52/746.1, 746.11, 302.1, DIG. 16, 409, 52/408
See application file for complete search history.

(56) References Cited

U.S. PATENT DOCUMENTS

| | | | | |
|---|---|---|---|---|
| 5,067,298 A * | 11/1991 | Petersen | .............. | E04D 13/1662 156/324.4 |
| 5,312,573 A * | 5/1994 | Rosenbaum | ........ | B29B 17/0026 264/148 |
| 6,065,255 A * | 5/2000 | Stern | ..................... | E04D 3/3608 52/173.3 |
| 7,638,007 B2 * | 12/2009 | Sehanobish | ........ | C08G 18/3253 156/307.1 |
| 7,900,413 B2 * | 3/2011 | Stanley | ................... | H02S 20/23 52/173.3 |
| 8,079,184 B2 * | 12/2011 | Wiercinski | .............. | B32B 27/12 428/144 |
| 9,103,123 B2 * | 8/2015 | Bradenburg | .............. | E04D 5/12 |
| 2006/0211819 A1 * | 9/2006 | Hoenig | ............... | C08L 23/0815 525/88 |
| 2010/0226943 A1 * | 9/2010 | Brennan | ............ | A41D 31/0077 424/400 |
| 2011/0041429 A1 * | 2/2011 | Rummens | .............. | F24J 2/4636 52/173.3 |
| 2011/0159224 A1 * | 6/2011 | Yang | ................... | B29C 65/5057 428/41.8 |
| 2011/0217540 A1 * | 9/2011 | Sandkuehler | ........... | C04B 33/04 428/319.1 |
| 2012/0208033 A1 * | 8/2012 | Weigel | ............. | B32B 17/10018 428/447 |
| 2013/0000811 A1 * | 1/2013 | Engeldinger | .............. | C09J 5/06 156/60 |

* cited by examiner

*Primary Examiner* — Joshua J Michener
*Assistant Examiner* — Keith Minter
(74) *Attorney, Agent, or Firm* — Black McCuskey Souers & Arbaugh, LPA

(57) ABSTRACT

A roofing system, assembly and related methods of manufacture and installation for simulating a metal roof includes a membrane which is installed over a roof deck and aesthetic ribs installed directly on the membrane layer.

10 Claims, 4 Drawing Sheets

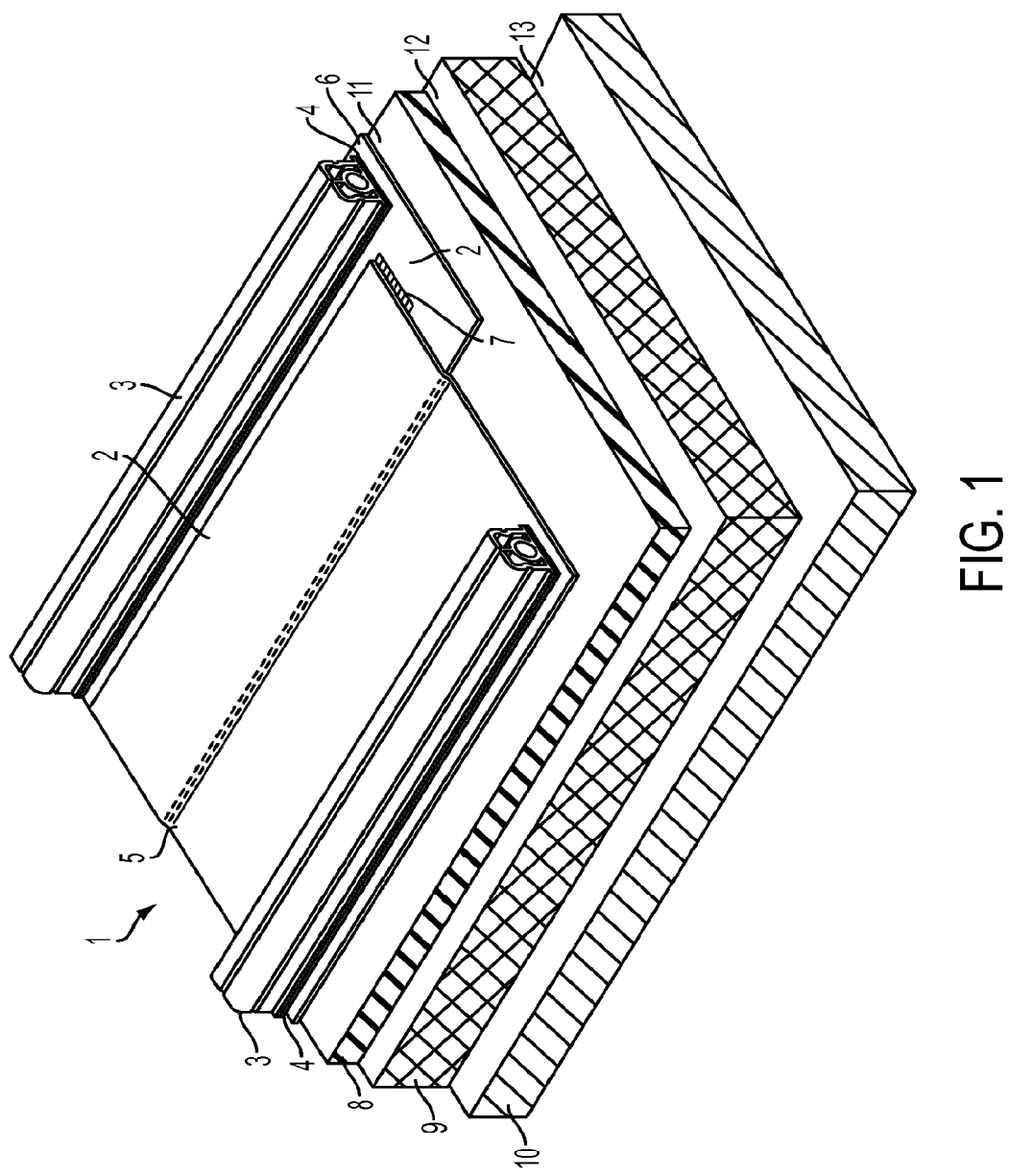

COMPOSITE ROOF SYSTEMS AND METHODS OF INSTALLATION

RELATED APPLICATIONS

This application is a continuation of U.S. application Ser. No. 14/169,953 filed Jan. 31, 2014, which claims priority to U.S. Provisional Application No. 61/759,619 filed on Feb. 1, 2013, the contents of which are expressly incorporated by reference.

FIELD OF THE INVENTION

The present invention is in the field of roofs for buildings, roofing systems, and related methods of manufacture, construction, assembly and installation.

BACKGROUND OF THE INVENTION

Metal roofs have great aesthetic appeal and can yield many years of protection. However, metal roofing systems are known to have leakage issues, particularly when metal is used for complex roofing designs such as changes in roof direction, valleys, wall seams and conduit or vent penetrations. Metal roofing systems are also expensive. There is a need in the art for a product that can provide the look of metal with a superior and durable leak protection at a lower cost.

SUMMARY OF THE INVENTION

The present invention is directed to a roofing system having several layers of synthetic polymeric roofing materials which are installed over a roof deck and in parallel and staggered or overlapping arrangements. Structural and aesthetic ribs, preferably made of extruded polymeric material are adhesively attached to sheet layers of the roof system, as further described.

DESCRIPTION OF THE DRAWINGS

The accompanying Appendices, drawing figures, cross-sectional and profile views, product specifications and brochures, best practices and installation guidelines are each parts of the present disclosure.

FIG. 1 is a view of the roofing system of the present invention.

FIG. 2 shows a cross section of a rib.

DETAILED DESCRIPTION OF PREFERRED AND ALTERNATE EMBODIMENTS

Figure 3:
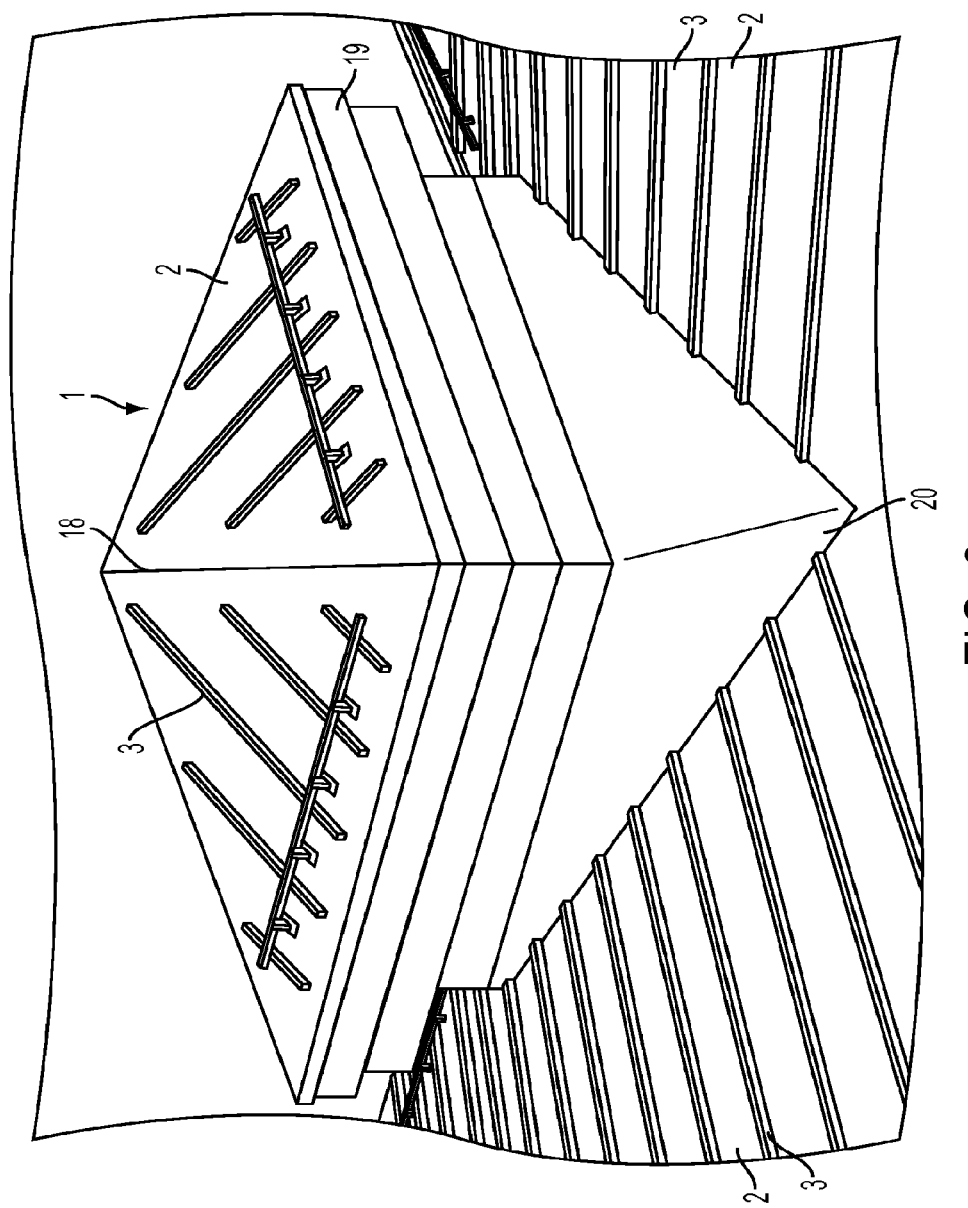
FIG. 3 shows a representative installation of the roofing system of the present invention.

Composite material roof systems and methods of installation of the present disclosure include, in representative embodiments, installed over a roof deck or similar support structure, overlapped and adhered sheets of roofing membranes which are also welded together.

Referring to FIG. 1, the composite roof system 1 of the present invention comprises a membrane 2 which is bonded to a roof deck 10 using an adhesive 11. Ribs 3 are bonded to the installed membrane 2 to give the look of a metal roof.

The roofing membrane 2 may be any suitable roofing membrane which meets code requirements as the outermost roofing layer and which is pleasing to the eye. In preferred embodiments the roofing membrane 2 is manufactured from waterproof and ultraviolet resistant materials. The roofing membrane 2 is typically smooth in texture but may contain textured surfaces if desired for aesthetic reasons.

In one embodiment the roofing membrane 2 is a polyester knit fabric containing ketone ethylene ester as the polymer. In preferred embodiments the roofing membranes are FTR roofing membranes from Seaman Corporation.

In one embodiment the membrane 2 is a nominal 36-mil ketone ethylene ester (KEE) membrane, reinforced with a 5.0-oz yd$^2$ knitted polyester fabric and heat-bonded 4 oz. polyester backing, meeting all requirements outlined in ASTM D 6754 Standard Specification for Ketone Ethylene Ester (KEE) Sheet Roofing. Such membranes are manufactured by Seaman Corporation, under the trade name FiberTite-FB In another embodiment the membrane 2 is a nominal 50-mil ketone ethylene ester (KEE) membrane, reinforced with a 6.5-oz yd$^2$ knitted polyester fabric and a heat-bonded 4 oz. polyester backing, meeting all requirements outlined in ASTM D 6754 Standard Specification for Ketone Ethylene Ester (KEE) Sheet Roofing. Such membranes are manufactured by Seaman Corporation, under the trade name FiberTite XT-FB In another embodiment the membrane 2 is a nominal 45-mil ketone ethylene ester (KEE) membrane, reinforced with a 5.0-oz yd$^2$ knitted polyester fabric and a heat-bonded 4 oz. polyester backing, meeting all requirements outlined in ASTM D 6754 Standard Specification for Ketone Ethylene Ester (KEE) Sheet Roofing. Such membranes are manufactured by Seaman Corporation, under the trade name FiberTite SM-FB.

In another embodiment the membrane 2 is a nominal 60-mil ketone ethylene ester (KEE), reinforced with a 12.5-oz yd$^2$ woven polyester mat and a heat-bonded 4 oz. polyester backing meeting all requirements outlined in ASTM D 6754 Standard Specification for Ketone Ethylene Ester (KEE) Sheet Roofing. Such membranes are manufactured by Seaman Corporation, under the trade name FiberTite-XTreme The ribs 3 can be made from any material which can be suitably affixed to the membrane using chemical or mechanical means. In a preferred embodiment, the rib cross section has a planar bottom attachment surface which has a width dimension equal to or greater than a width dimension of a body portion of the rib which extends generally perpendicular from the planar bottom, so that the attachment surface is the widest dimension of the rib. Such ribs could be manufactured from plastics, metals or any material capable of simulating a metal roofing rib. Most preferred are plastic extrusions which can be bound with adhesives. FIG. 2, shows a cross section of an extruded Rib 3. The rib 3 can be made to have any geometric profile, but are most commonly square, triangular or circular in shape. The rib 3 must have a bonding surface 16 which is capable of conforming to the shape of the installed roofing membrane 2. An adhesive 4 may be applied to the bonding surface 16 of the rib 3 during manufacturing or during installation. In one embodiment the rib 3 contains a coextruded thermally activated adhesive strip, such as ketone ethyl ester, on the bottom for easy installation over roofing membranes 2. The adhesive strip on the bottom of the rib 3 ensures complete compatibility with other roofing membranes 2 thereby increasing the durability of the roofing system. In this embodiment, the rib 3 may be adhered to roofing membranes using conventional hot air equipment known in the art.

In preferred and alternate embodiments, ribs 3 for example, in the form of extrusions such as plastic extrusions, are adhesively attached to the uppermost polymeric membrane layers 2 of the roof system 1. The manufacture of the ribs 3 as an extrusion, 15 such as a continuous polymeric extrusion for end application as a primary roof surface component is part of the present disclosure and related inventions. Referring to FIGS. 1, and 3-5, the ribs 3 can be installed and arranged in long parallel and spaced apart layouts, for example parallel with the direction of pitch of the roof deck and generally perpendicular to roof peak, ridge or edge. The ribs 3 may run part or all of the length of a roof surface, from peak or ridge line to an edge. The ribs 3 project vertically from the generally planar surface of the polymeric membrane layers 2, and the ribs 3 may have cross-sectional dimensional thickness, both width and height, and any internal structure or solid material. The exterior configuration of the ribs 3 may be generally smooth, planar, dimensional with relief features such as one or more grooves or textures, including any extrudable configuration or design or color. Preferably, the ribs have a generally planar bottom side or surface or underside 16 for adhesive attachment to the polymeric membrane material of the roof system.

The ribs 3 can be produced and delivered in flexible coils of various lengths, e.g. 100 feet (30.5 m) in length and cut into appropriate strip lengths on the construction site. In other instances, the ribs 3 may be delivered precut to size. The ribs 3 contain a coextruded thermally activated adhesive strip 4 on the bottom for easy installation over roofing membranes, such as a fleece back membrane 2. The adhesive strip on the bottom of the ribs 3 ensures complete compatibility with other roofing membranes thereby increasing the durability of the roofing system. The ribs 3 may be adhered to roofing membranes using conventional hot air equipment.

In a preferred embodiment, the rib 3 cross section has a planar bottom attachment surface which has a width dimension equal to or greater than a width dimension of a body portion of the rib 3 which extends generally perpendicular from the planar bottom, so that the attachment surface 16 is the widest dimension of the rib 3. In some embodiments, the ribs 3 when applied in parallel arrangements as described and shown, and in certain configurations may be similar in appearance to metal roof assemblies which employ "standing seams" formed by vertically oriented overlapping sheets of metal. These particular embodiments of the present disclosure are sometimes referred to as "simulated metal roof profile" or "SMRP".

The adhesives used in attaching the rib 3 to the roofing membrane 2 must be compatible with the material of the rib 3 and the roofing membrane 2. One of skill in the art will be able to choose suitable adhesives. Examples of adhesives commonly used in construction include epoxy, polysufides, polyurethanes, ketone ethylene esters, In one embodiment the adhesive is a VOC compliant solvent borne, contact (two-sided) nitrile/pvc bonding adhesive, designed for bonding non-fleece back FiberTite membranes to properly prepared and preauthorized horizontal and vertical substrates. Such an adhesive is manufactured and sold by Seaman Corporation as FTR-190e bonding adhesive.

In another embodiment the adhesive is a VOC compliant solvent borne adhesive, one side application (substrate only), designed for bonding FiberTite-FB (fleece back) membranes to properly prepared and preauthorized horizontal substrates. Such an adhesive is manufactured and sold by Seaman Corporation as FTR-290 adhesive.

In another embodiment the adhesive is a rubberized/asphalt water borne emulsion adhesive, VOC compliant, one-side application (substrate only), designed for bonding FiberTite-FB (fleece back) membranes to properly prepared and preauthorized horizontal substrates. Such an adhesive is manufactured and sold by Seaman Corporation as FTR-390 adhesive.

In another embodiment the adhesive is a polymeric waterborne, VOC compliant adhesive, one-side application (substrate only), designed for bonding FiberTite-FB (fleece back), FiberTite-SM and FiberTite Brite to properly prepared and preauthorized horizontal substrates. Such an adhesive is manufactured and sold by Seaman Corporation as FTR-290 adhesive.

In another embodiment the adhesive is a dual component elastomeric polyurethane froth adhesive designed for bonding Fleece Back FiberTite membranes (spatter application) to properly prepared and preauthorized horizontal and vertical substrates. Such an adhesive is manufactured and sold by Seaman Corporation as Fibertite CR-20 adhesive.

In another embodiment the adhesive is a trowel grade elastomeric adhesive/sealant containing synthetic rubber and resin used to adhere FiberTite flashing membranes to preapproved vertical substrates. Such an adhesive is manufactured and sold by Seaman Corporation as FTR-201 mastic.

Suitable substrates for installing the membrane, include, but are not limited to insulation, coverboard, concrete, steel decking, plywood and/or cementitious fiber or gypsum. A combination of more than one of these substrates may be present on a roof. In some embodiments underlayment layers of insulation 9 and gypsum cover board 8 may be used, each attached to the underlying layer using means acceptable under the building code. In one embodiment one embodiment the insulation or gypsum cover board are attached with suitable adhesives. In another embodiment, the insulation or gypsum cover board are attached with mechanical fasteners such as nails or screws. In another embodiment, a combination of adhesives and mechanical fasteners are used.

The roof systems 1 of the present disclosure and related inventions include several layers of roofing membranes 2 or substrates in addition to ribs 3 which are installed over the membrane layers at specified intervals to simulate the aesthetics of a metal roof system. The roofing system is particularly useful in complex roofing designs such as, among other things, changes in direction, peaks, valleys, wall joints, and penetrations.

In one embodiment of the present invention, the roofing system 1 includes a roof deck 10 or substrate, a layer of insulation 8 having a top surface and a bottom surface opposite the top surface, the bottom surface of the insulation layer in contact with and adhered to a top surface of the roof deck or substrate, an optional layer of gypsum cover board 9 having a top surface and a bottom surface opposite the top surface, the bottom surface of the gypsum board in contact with and adhered to a top surface of the insulation layer, and an fleece membrane 2 having a top surface and a bottom surface opposite the top surface, the bottom surface of the fleece membrane 2 in contact with and adhered to the top surface of the optional gypsum cover board layer 8. It is preferred that the insulation layer is laid down in a staggered or offset profile to prevent aligned edges with the overlying layers field seams. The insulation layer may be comprised of fiberglass or other insulation material. There may be more than one insulation layer and one or more substrate layers.

The installation of the roofing membrane and its various underlayments is done in a conventional fashion in accordance with building code requirements. The membrane 2 should be installed such that it is flat and seams 7 oriented for aesthetics, generally the seams 7 are oriented vertically.

Figure 4:
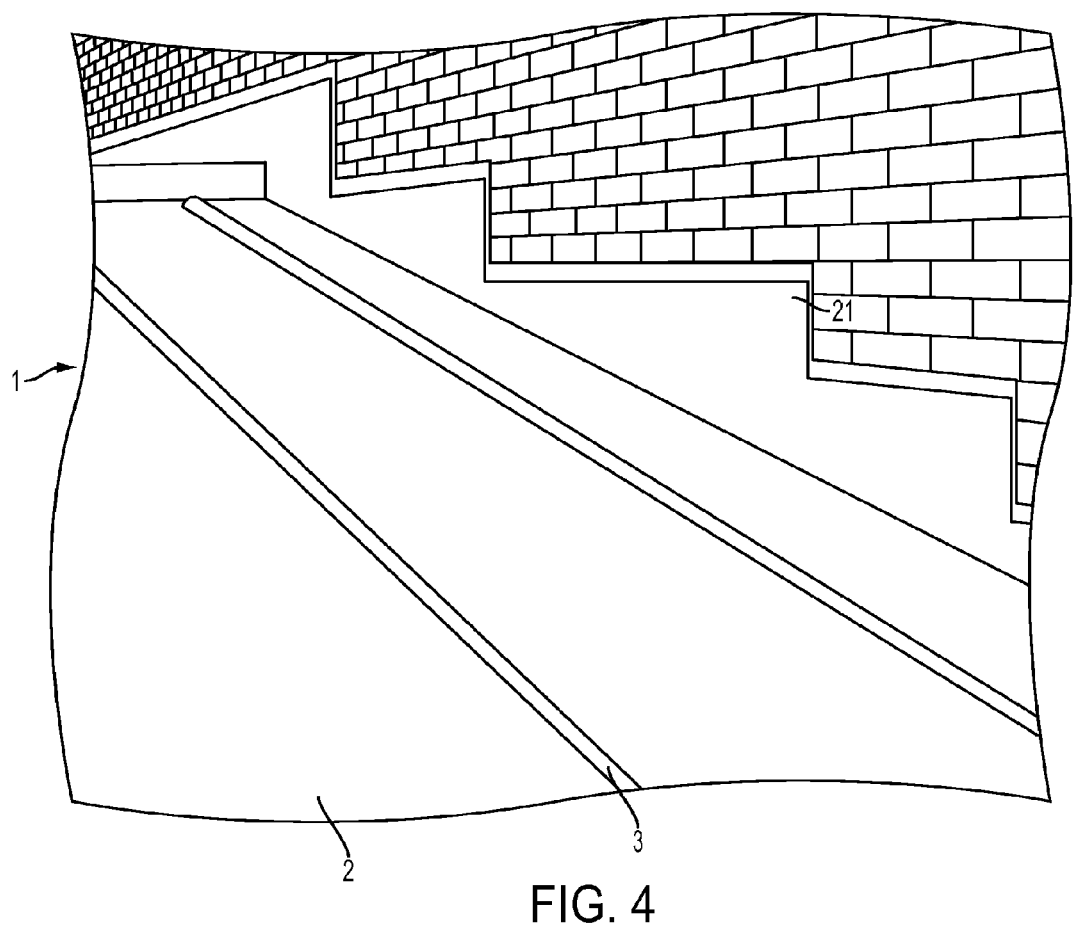
FIG. 4 shows a representative installation of the present invention against a wall.
Figure 5:
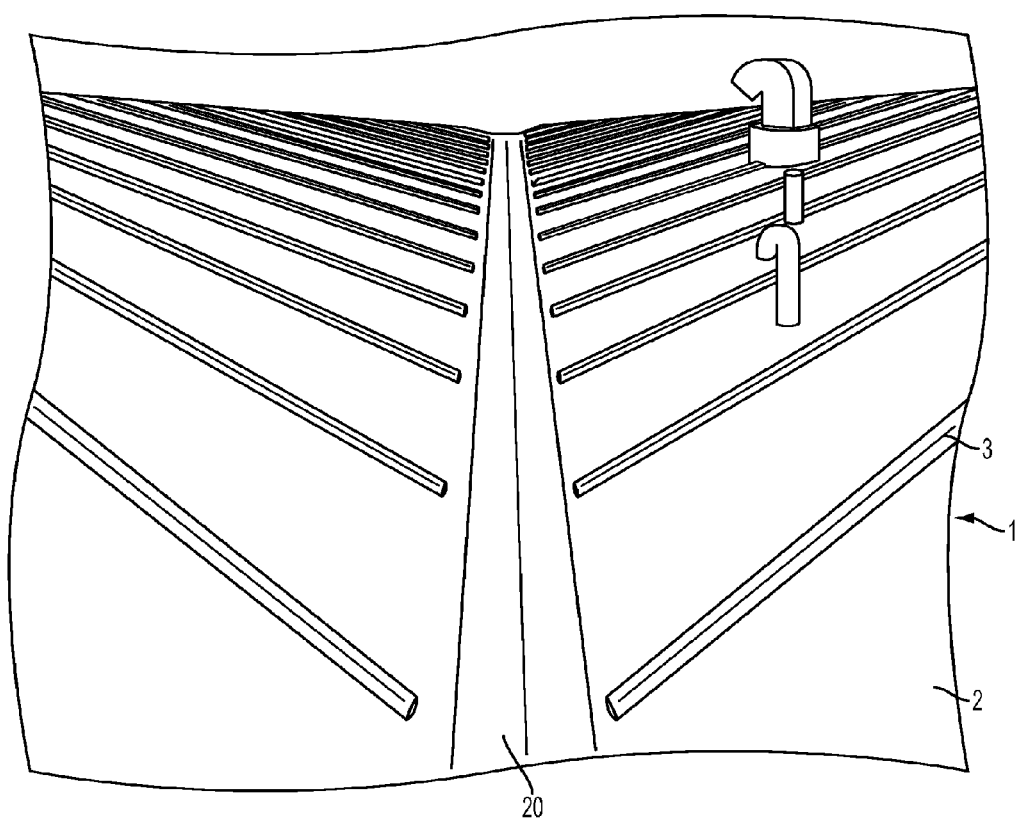
FIG. 5 shows a representative installation of the present invention in a roof valley.

Once the various roofing layers, discussed above, are in place, the ribs 3 may be secured to the membranes 2, for example in a parallel arrangement and at specified intervals, equal or inequal spacing. Referring to FIG. 1, preferably, the ribs 3 should be aligned at least approximately ¼-inch off of the field seams 7 in the membrane 2. Referring to FIGS. 3-5, the ribs 3 installed in between the seams 7 should be preferably equidistant and held back from ridges 18 and edges and eves 19 and valleys 20 approximately 6-inches.

The installation of the ribs 3 is best carried out my marking their position on the installed membrane 2 with any suitable means, such as a chalk line. The ribs 3 are laid onto position and cut to size with a suitable cutter. If the ribs 3 are coiled, the coil would be straightened out and cut to length. Once aligned, the ribs 3 are adhered to the membrane 2. In a preferred embodiment the adhesive 4 preinstalled on the ribs 3 is heat activated such as KEE and will be installed using conventional hot air equipment taking care to keep the ribs 3 straight.

When installing the present roofing system 1, the layout of the membrane 2 should take into account the desired installation locations for the ribs 3. On inclines greater than $2/12$ it is preferred to seal the membrane by starting on the bottom of the roof and seal it uphill. The membrane should be installed flat and with seems oriented vertically for best results.

The roofing system of the present design may be produced in any desirable color including, but not limited to: beige; gray; white; off white; slate; terra cotta; tan; and green. Custom coloring is also possible.

While the invention is susceptible to various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

What is claimed is:

1. A composite material roof system comprising, in combination, a membrane comprised of nominal 36-mil ketone ethylene ester (KEE) reinforced with a 5.0 oz./yd$^2$ knitted polyester fabric and heat-bonded 4 oz. polyester backing, the membrane meeting all requirements of ASTM D 6754,
    a plurality of ribs attached to a surface of the membrane, the ribs formed of a polymeric material and having a cross-section configuration which includes a planar bottom with a planar bottom attachment surface and a body portion which extends generally perpendicular from the planar bottom, the body portion having a width dimension which is less than a width dimension of the planar bottom attachment surface, and a hot melt adhesive on the planar bottom attachment surface of the ribs and bonded to the ketone ethylene ester (KEE) material of the membrane.

2. The composite roof system of claim 1 wherein the plurality of ribs are in the form of extrusions.

3. The composite material roof system of claim 1 wherein the hot melt adhesive is combined with the ribs prior to attachment of the ribs to the membrane.

4. The composite material roof system of claim 1 wherein the hot melt adhesive is ketone ethylene ester.

5. The composite material roof system of claim 1 wherein the hot melt adhesive has a melt temperature that is between 200 degrees F. and 300 degrees F.

6. The composite roof system of claim 1 wherein the plurality of ribs are cut from the extrusion.

7. A composite material roof system comprising, in combination, a membrane comprised of nominal 50-mil ketone ethylene ester (KEE) reinforced with a 6.5 oz./yd$^2$ knitted polyester fabric and heat-bonded 4 oz. polyester backing, the membrane meeting all requirements of ASTM D 6754,
    a plurality of ribs attached to a surface of the membrane, the ribs formed of a polymeric material and having a cross-section configuration which includes a planar bottom with a planar bottom attachment surface and a body portion which extends generally perpendicular from the planar bottom, the body portion having a width dimension which is less than a width dimension of the planar bottom attachment surface, and a hot melt adhesive on the planar bottom attachment surface of the ribs and bonded to the ketone ethylene ester (KEE) material of the membrane.

8. A composite material roof system comprising, in combination, a membrane comprised of nominal 45-mil ketone ethylene ester (KEE) reinforced with a 5.0 oz./yd$^2$ knitted polyester fabric and heat-bonded 4 oz. polyester backing, the membrane meeting all requirements of ASTM D 6754;
    a plurality of ribs attached to a surface of the membrane, the ribs formed of a polymeric material and having a cross-section configuration which includes a planar bottom with a planar bottom attachment surface and a body portion which extends generally perpendicular from the planar bottom, the body portion having a width dimension which is less than a width dimension of the planar bottom attachment surface, and a hot melt adhesive on the planar bottom attachment surface of the ribs and bonded to the ketone ethylene ester (KEE) material of the membrane.

9. A composite material roof system comprising, in combination, a membrane comprised of nominal 60-mil ketone ethylene ester (KEE) reinforced with a 12.5 oz./yd$^2$ woven polyester fabric and heat-bonded 4 oz. polyester backing, the membrane meeting all requirements of ASTM D 6754;
    a plurality of ribs attached to a surface of the membrane, the ribs formed of a polymeric material and having a cross-section configuration which includes a planar bottom with a planar bottom attachment surface and a body portion which extends generally perpendicular from the planar bottom, the body portion having a width dimension which is less than a width dimension of the planar bottom attachment surface, and a hot melt adhesive on the planar bottom attachment surface of the ribs and bonded to the ketone ethylene ester (KEE) material of the membrane.

10. A composite material roof system comprising, in combination, a membrane comprised of ketone ethylene ester (KEE) with a nominal weight in an approximate range of 36-mil to 50-mil reinforced with knitted polyester fabric with a density in an approximate range of 5.0 to 6.5 oz/yd$^2$ and heat-bonded polyester backing, the membrane meeting all requirements of ASTM D 6754;

a plurality of ribs attached to a surface of the membrane, the ribs formed of a polymeric material and having a cross-section configuration which includes a planar bottom with a planar bottom attachment surface and a body portion which extends generally perpendicular from the planar bottom, the body portion having a width dimension which is less than a width dimension of the planar bottom attachment surface, and a hot melt adhesive on the planar bottom attachment surface of the ribs and bonded to the ketone ethylene ester (KEE) material of the membrane.

* * * * *